United States Patent [19]

Okada et al.

[11] Patent Number: 5,438,725
[45] Date of Patent: Aug. 8, 1995

[54] APPARATUS FOR REMOVING EXCESSIVE ADHESIVES FROM FERRULES

[75] Inventors: Kinjiro Okada; Hiromasa Shiraishi, both of Tokyo; Hirokazu Yokosawa, Nagano; Shinichi Takehana, Nagano; Norio Kobayashi, Nagano, all of Japan

[73] Assignee: Hirose Electric Co., Ltd., Tokyo, Japan

[21] Appl. No.: 207,253

[22] Filed: Mar. 8, 1994

Related U.S. Application Data

[63] Continuation-in-part of Ser. No. 886,360, May 21, 1992, abandoned.

[30] Foreign Application Priority Data

May 22, 1991 [JP] Japan ................. 3-145247

[51] Int. Cl.6 ............................................. A47L 25/00
[52] U.S. Cl. ................................. 15/97.1; 15/104.04; 15/210 R; 385/100
[58] Field of Search ............... 15/97.1, 210.1, 220.4, 15/250.24, 99, 268, 104.04; 385/100, 134, 147, 72; 134/42, 15, 6

[56] References Cited

U.S. PATENT DOCUMENTS

| 478,824 | 7/1892 | Shostak | 15/104.04 |
| 2,392,490 | 1/1946 | Maruri | 15/104.04 |
| 4,817,645 | 4/1989 | Vogel | 15/220.4 |
| 5,117,528 | 6/1992 | Kanayama et al. | 15/97.1 |

FOREIGN PATENT DOCUMENTS 0113966 9/1979 Japan ............................ 15/97.1

Primary Examiner—David A. Scherbel
Assistant Examiner—Gary K. Graham
Attorney, Agent, or Firm—Kanesaka & Takeuchi

[57] ABSTRACT

An apparatus for removing excessive adhesives from ferrules, includes a holding device (1, 2) for holding the end face of a ferrule (F) at a predetermined position; a string member (4) for adsorbing or absorbing the adhesives; and a drive unit (3) for driving the string member on or near the end face of the ferrule.

3 Claims, 1 Drawing Sheet

APPARATUS FOR REMOVING EXCESSIVE ADHESIVES FROM FERRULES

This is a C-I-P application of Ser. No. 886,360, filed May 21, 1992, now abandoned.

BACKGROUND OF THE INVENTION

1. Field of the Invention

The present invention relates to apparatus for removing excessive adhesives from ferrules.

2. Description of the Prior Art

Optical fibers are connected to ferrules by applying adhesives to ferrules and inserting optical cables into the ferrules. In general, the adhesives are in the form of aqueous solutions, and as the optical cables advance, the adhesives flow over the ferrules forming bodies of excessive adhesives.

If left uncleaned, the excessive adhesives become hard providing an ugly appearance. In addition, some of the excessive adhesives fall on the floor making it dirty. Thus, the excessive adhesives have been manually wiped out with cloth.

However, such manual wiping operation has the following disadvantages: (1) It not only takes much time but also varies with the workers, causing many instances of insufficient removal of the adhesives. (2) The adhesives adhere to the hands and/or other locations, presenting a hygienic problem. (3) The wiping operation can spread the excessive adhesives to even other areas of the optical cables. (4) The wiping operation can accidentally move the optical cables from the right insertion position within the ferrules.

SUMMARY OF THE INVENTION

Accordingly, it is an object of the invention to provide simple and safe apparatus for removing excessive adhesives from ferrules uniformly without requiring much skill.

According to the invention there is provided an apparatus for removing excessive adhesives from ferrules, which includes a holding device for holding the end face of a ferrule at a predetermined position; a string member for adsorbing or absorbing the adhesives; and a drive unit for driving the string member on or near the end face of the ferrule.

The holding device includes a holding unit for holding an optical cable and a positioning unit for holding a ferrule such that an end face of the ferrule is placed in a predetermined position. The positioning unit includes a block member having a V-shaped groove thereon for supporting a ferrule and a front face for abutment with a flange of the ferrule thereby bringing an end face of the ferrule to a predetermined position. The preferred string member is a cotton thread.

After an optical cable is put into a ferrule, the ferrule with an excessive adhesive is held by the holding device before the adhesive become hard such that the end face of the ferrule is placed in a predetermined position. Then, the string member is run by the drive unit on or near the end face of the ferrule to adsorb or absorb the excessive adhesive and take it out with it.

The above and other objects, features, and advantages of the invention will be more apparent from the following description when taken in conjunction with the accompanying drawings.

DESCRIPTION OF THE PREFERRED EMBODIMENT

Figure 1:
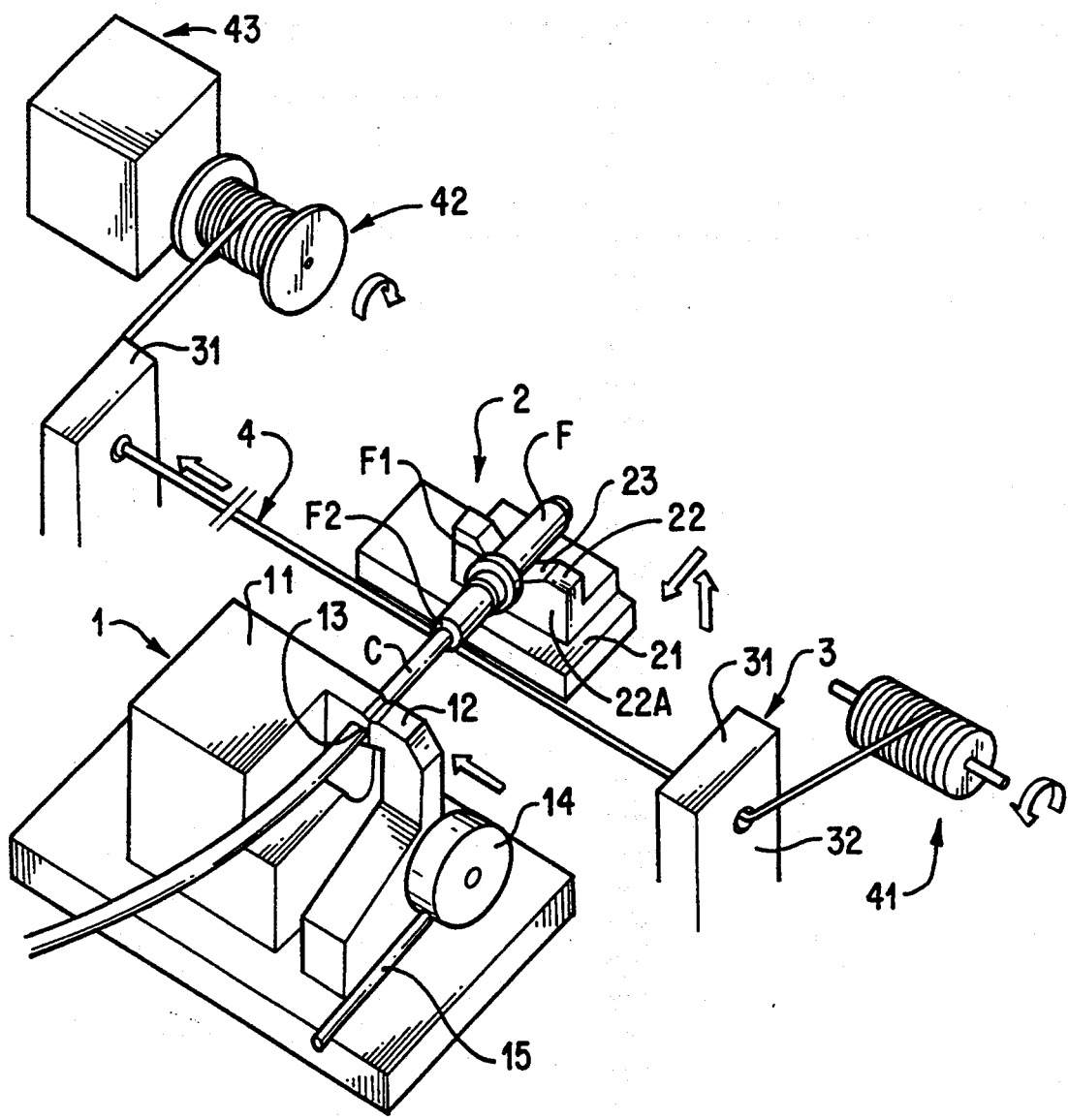
FIG. 1 is a perspective view of an apparatus for removing excess adhesives from ferrules according to an embodiment of the invention.

In FIG. 1, a holding unit 1 holds an optical cable C to which a ferrule F has been attached. A positioning unit 2 holds and positions the ferrule F. The holding unit 1 and the positioning unit 2 constitute a holder device.

The holding unit 1 has a pair of clamp members 11 and 12 which are movable relative to each other. In this embodiment, the clamp member 11 is fixed while the clamp member 12 is movable. A cable receiving groove 13 having a depth slightly less than the diameter of an optical cable is formed on an abutment face of the clamp member 11. An abutment face of the clamp member 12 presses the optical cable C into the receiving groove 13 to hold it in place. The clamp member 12 is moved toward the clamp member 11 by a disk cam 14 which is turned by a lever member 15.

The positioning unit 2 includes a support base 21 and a block member 22 placed on the support base 21. A V-shaped groove 23 is formed on the block member 22 to support the ferrule F. The support base 21 is movable both vertically and horizontally, and a front face 22A of the block member 22 abuts a flange F1 of the ferrule F so that the block member 22 positions the ferrule F in place.

A string running unit 3 includes a pair of guide posts 31 set on opposite sides of the positioning unit 2 as well as a supply reel 41 a take-up reel 42 and a drive unit 43. A guide aperture 32 has a low friction guiding ring. A string member 4, such as a cotton thread or tape, is run by the take-up unit through the guiding apertures 32. The guiding apertures 32 are disposed so that the string member 4 slides on or runs near the end face of the ferrule F.

The apparatus as described above removes excessive adhesives as follows.

(1) The clamp members 11 and 12 of the holding unit 1 are separated, and an optical cable C to which a ferrule F has been attached is put in the cable receiving groove 13.

(2) The clamp member 12 is moved until it abuts the clamp member 11. As a result, the optical cable is slightly compressed and held within the receiving groove 13. Under this condition, the ferrule F sags slightly by its weight.

(3) The positioning unit 2 is raised so that the block member 22 supports within the V-shaped groove 23 and lifts the ferrule F to a predetermined level. Then, the positioning unit 2 is advanced so that the front face 22A of the block member 22 abuts the flange F1 of the ferrule F bringing the end face F2 of the ferrule F to a predetermined position.

(4) The running string member 4 absorbs and/or removes excessive adhesives from the end face F2 of the ferrule F. In this way, the excessive adhesives are removed mechanically.

Alternatively, the positioning unit may be moved so that the ferrule is advanced slightly beyond the predetermined position thereby correcting insufficient insertion, if any, of the optical cable into the ferrule before the adhesives become hard. The string member may be any strip which is able to take the excessive adhesives with it. In order to save the string member, it may be made an endless loop with a cleaning unit for cleaning it somewhere in the middle. A number of ferrules may be placed side by side along the string member to remove all of the excessive adhesives with a single string member.

As has been described above, according to the invention, excessive adhesives are removed by a running string member so that the removing operation is reliable and efficient. In addition, by placing the removing step subsequent to the step of inserting optical cables into ferrules it is possible to provide an entirely automated assembly line which needs no manual operations and is free from hygienic concerns.

We claim:

1. Apparatus for removing an excessive liquid adhesive from an elongated ferrule which is attached to an elongated optical cable, said ferrule defining a longitudinal axis and having an elongated cylindrical side face, a front end face, and a rear end face, said apparatus comprising:

a string member having a longitudinally extending portion lying in a vertical plane;

a string running unit including a pair of spaced guide posts for supporting said string member therebetween, a take-up reel attached to said string member, and a driving motor coupled with said take-up reel for moving said string member between said guide posts; and a holder device consisting of a holding unit and a positioning unit provided on opposite sides of said plane, said holding unit including a pair of clamp members for holding said optical cable in a horizontal position so that said optical cable is superimposed on said string member, and said positioning unit supporting said ferrule such that said longitudinal axis thereof is held horizontally and said positioning unit being vertically and horizontally movable to position a bottom portion of said rear end face of said ferrule in contact with said string member so that any excessive adhesive liquid thereon adheres to said string member and is removed from said rear end face as said string member is moved.

2. Apparatus for removing an excessive liquid adhesive from an elongated ferrule which defines a longitudinal axis and has an elongated cylindrical side face, a front end face, and a rear end face from which an optical cable extends rearwardly, and a flange extending radially from said side face in a position between said front and rear end faces, said apparatus comprising:

string means made from a material to which said excessive liquid adhesive adheres, said string means having a longitudinally extending portion defining a longitudinal axis;

positioning means for supporting and holding said ferrule with said longitudinal axis thereof perpendicular to the longitudinal axis of said string means and lying in a horizontal plane, said positioning means including a block member having front and top faces with a V-shaped groove on said top face for receiving the cylindrical side face of said ferrule with the front face of the block member in abutment with a rear face of said flange of said ferrule thereby bringing said rear end face of said ferrule to a predetermined position in which said rear end face of said ferrule is brought into contact with said string means; and string running means including a take-up reel attached to said string means and a driving motor coupled with said take-up reel for driving said string means in contact with a lower portion of said rear end face below said optical cable so that any excessive liquid adhesive thereon adheres to said string means and is removed from said rear end face thereby as said string means is driven away from said rear end face.

3. The apparatus of claim 2, wherein said string means is a thread.

* * * * *